United States Patent [19]

Persbeck

[11] 4,257,585
[45] Mar. 24, 1981

[54] SUPPORTING STRUCTURE
[75] Inventor: Sven E. Persbeck, Torslanda, Sweden
[73] Assignee: Götaverken Arendal AB, Sweden
[21] Appl. No.: 78,818
[22] Filed: Sep. 25, 1979
[30] Foreign Application Priority Data
Sep. 27, 1978 [SE] Sweden ............................... 7810118
[51] Int. Cl.³ ............................................... B25B 5/14
[52] U.S. Cl. .................................................... 269/133
[58] Field of Search ......................................... 269/133
[56] References Cited
U.S. PATENT DOCUMENTS
1,557,963  10/1925  Barger .................................... 269/133

Primary Examiner—Robert C. Watson
Attorney, Agent, or Firm—Cantor and Singer

[57] ABSTRACT

When beams are to be welded to large plates, temporary supporting structures comprising a pair of L-shaped horses, are used, each horse being provided with a slot extending mainly at 45° upwardly/outwardly from the corner formed by the base flange and the waist of the L. A plate member, having a middle portion corresponding to the thickness of the beam and two flanges, angularly disposed with respect to the middle portion, connects the two horses. In use, the weight of the beam rests upon the middle portion of the plate member and locks the horses in supporting position. The horses are preferably provided with screws for clamping the flanges in the slots.

2 Claims, 3 Drawing Figures

U.S. Patent
Mar. 24, 1981
4,257,585
FIG. 1
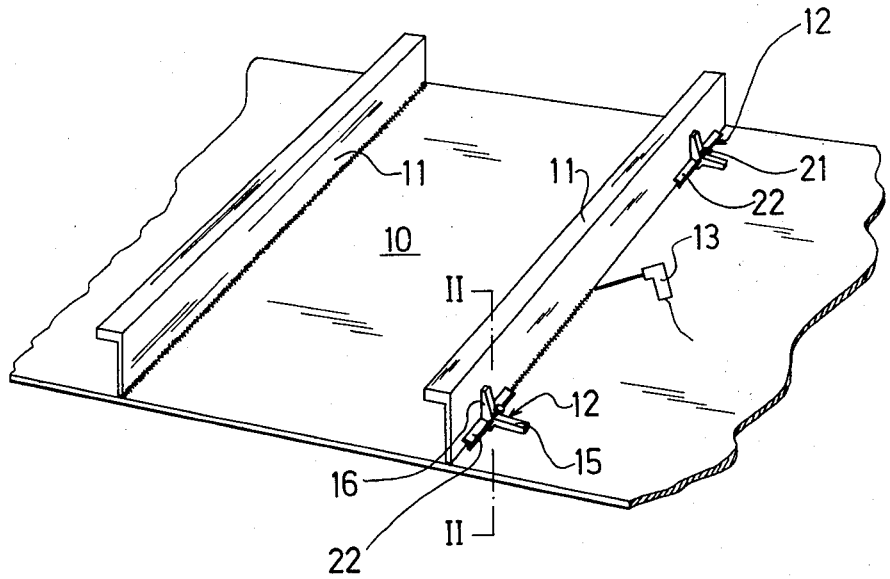
FIG. 2
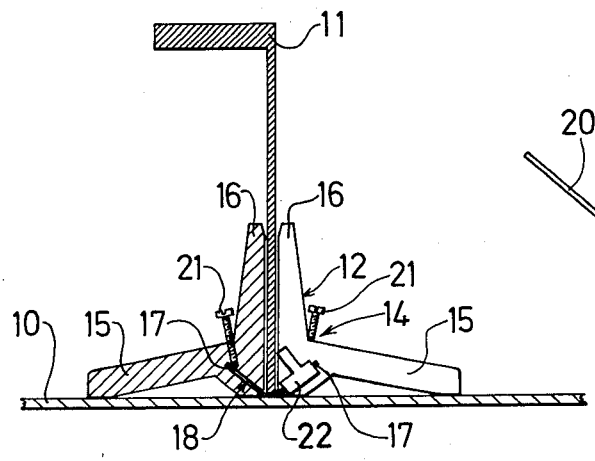
FIG. 3

SUPPORTING STRUCTURE

BACKGROUND OF THE INVENTION

When beams are to be welded to large plates, which is a common procedure within the shipbuilding industry, the beams are first adjusted to their proper positions, and are then positioned by means of brackets welded to the plate. The beams are often heavy, and when L- or T-profiles are involved furthermore top-heavy, which necessitates a careful design and application of the supporting brackets.

The removal of the brackets will furthermore impair the faces of the beam and the plate, and if the faces have been painted or otherwise surface treated noticeable damages will remain.

Similar problems will occur, when webbs and bulkheads are to be fitted, and will also be met within other branches for instance within the house-building industry, where it may be desirable to temporarily support beams, wall sections and the like until the final fitting can be done.

SUMMARY OF THE INVENTION

The aim of the present invention is to propose a supporting structure adapted for the temporary positioning of an upright member with respect to a substrate. This supporting structure will not have to be attached to the substrate, or to the member, but the weight of the latter provides the essential locking function.

A supporting structure according to the invention comprises a pair of substantially L-shaped horses, each being provided with a slot, which, in use, will form an angle with the plane of the substrate, starting from the base flange of the L, adjacent to the corner formed by the base flange and the waist portion of the horse, and at least one plate member, each comprising a middle portion exceeding the thickness of the upright member, as well as two flanges continuing the middle portion and adapted each to be fitted into a slot at each horse of the pair, provided to each side of the upright member.

Each horse is preferably provided with at least one tightening screw for locking the flange of a plate member introduced into the horse, the angle of the groove preferably being about 45°.

BRIEF DESCRIPTION OF THE DRAWING

FIG. 1 shows a portion of a large plate-flat, to which beams are to be welded,

FIG. 2 shows a cross section through the supporting structure, along line II-II in FIG. 1, and FIG. 3 shows, on a somewhat larger scale, an end view of a plate member.

DESCRIPTION OF A PREFERRED EMBODIMENT

In FIG. 1 reference 10 denotes a portion of a plate-flat, and 11 two beams, having L-shaped cross section attached thereto. At the left-hand beam the welding operation is terminated, while welding is still being performed at the right hand beam, the latter being retained in the desired position by means of two supporting structures 12, which will be described below in connection with FIG. 2.

The welding is performed by means of an apparatus, schematically denoted at 13, but it is evident that a major portion of the welding operation may be performed by means of automatic welding machines of arbitrary, known type.

As is best evident from FIG. 2, a supporting structure comprises two substantially L-shaped horses 14, each having a base flange 15, which is to be turned towards the plate 10, and a waist portion 16, which, in use, will be directed vertically upwards from the latter.

The base flange preferably is not plane over its full face turned towards the plate, but has one plane surface adjacent to the corner between the base flange and the waist portion as well as a further plane surface along its distal edge, the base flange being undercut between those two surfaces.

The horses 14 are suitably manufactured from thick plate material, and are provided with sidewardly projecting lugs 22, for instance short lengths or T-bars, welded to the main body of the L.

Each horse is, at the plane surface of its base flange 15, adjacent to the corner between the base flange and the waist portion, provided with a slot 17, which, in use, is directed obliquely outwards/upwards from the plate-flat, preferably at an angle of about 45°. These slots are sidewardly partly closed by lugs 22, which however, do not reach fully along the slots, but leave their outward ends accessible for inspection.

The horses 14 are fitted in mirror image position to opposite sides of a beam 11, and are retained in their mutual positions by a plate member 18, of the type shown on a larger scale in FIG. 3. Each plate member comprises a middle portion 19, which has a length slightly exceeding the thickness of the waist of the beam 11. Two flanges 20 issue from the middle portion, the angular positions and the sizes of the flanges mating with the slots 17 in the horses 14.

The beam 11 will initially stand fully free upon the plate members 18, with a slight play with respect to the waist portions 16 of the horses. The weight of the beam 11 will ensure a satisfactory locking for the positioning, and it will not be necessary to weld any attachments to the plate, or to the beam.

Each horse 14 is provided with a screw 21, which fits into a threaded bore in the horse, and is extendible to a portion of the slot 17, where flange 20 is inserted.

The plate member 18 is preferably manufactured from a length of steel strip, having the necessary strength to withstand the strains caused by a tilting tendency of the beam. If such tendency should occur, the waist of the beam will act as a lever, resting upon the upper edge of one horse and applying a force at the lower portion of the other horse. The plate member 18 will then be subjected to a straining action, but will during such conditions, be able to take care of considerable stresses. It may happen, that the corner portions of the horses will be lifted somewhat from the plate substrate, and that the ends of base flanges 15 are pulled towards each other, when the upper ends of waist portions 16 are forced apart, but a considerable deflection will be required to make the beam tilt over.

When the position of the beam has been adjusted a short weld is applied at one end of the beam, and thereafter seams of weld are applied between the supporting members to ensure that the beam remains in the selected position.

Thereafter screws 21 are loosened and the horses 14 are removed. The plate members 18 are pulled out, which usually is possible when applying a "wiggling" movement to the member. It may be necessary to force one of the flanges 20 downwards, or to cut it off, before the plate member can be withdrawn sidewardly.

The invention may be used with bent beams as well as with slightly vaulted plate-flats. The number of supporting structures will have to be selected to suit the length of the beam in question, but usually at least two supporting structures should be used at each beam.

The invention may, as mentioned above, be used also within other branches of industry, and the shape and size of the horses, as well as the material thereof may vary in many ways within the scope of the appended claims, depending upon the intended use of the supporting structure.

What I claim is:

1. A supporting structure for temporarily positioning an upright member with respect to a substrate, to which the member is to be permanently attached and comprising:

a pair of substantially L-shaped horses, each having a base flange and a waist portion meeting at a substantially right-angled corner and further provided with a slot, which, in use, will form an angle of about 45 with the plane of the substrate, starting from said base flange, adjacent to said corner formed by said base flange and said waist portion, and at least one plate member, each comprising a middle portion exceeding the thickness of said upright member, as well as two flanges continuing said middle portion, and adapted each to be removeably fitted into said slot at each horse of the pair provided to each side of the upright member, each horse being provided with at least one tightening screw for locking by engaging the top face of said flange of the plate member introduced into the horse.

2. A supporting structure according to claim 1 wherein said base flange has a planar surface substantially normal to said waist portion at its proximal end, another planar surface normal to said waist portion at its distal end, and an undercut portion between said ends.

* * * * *

UNITED STATES PATENT AND TRADEMARK OFFICE
CERTIFICATE OF CORRECTION

PATENT NO. : 4,257,585
DATED : March 24, 1981
INVENTOR(S) : Sven-Eric Persbeck

It is certified that error appears in the above-identified patent and that said Letters Patent are hereby corrected as shown below:

Cover Page, item [73] Assignee:, delete "Gotaverken Arendal AB, Sweden"

Signed and Sealed this

Second Day of June 1981

[SEAL]

Attest:

RENE D. TEGTMEYER

Attesting Officer        Acting Commissioner of Patents and Trademarks